United States Patent [19]

Kawabata et al.

[11] Patent Number: 5,035,318
[45] Date of Patent: Jul. 30, 1991

[54] ACCELERATION ACCUMULATING CONVEYOR CHAIN

[76] Inventors: Yasukazu Kawabata, 35-8, Nagao-Nishi-machi 3-chome, Hirakata-shi, Osaka-fu; Susumu Hamaguchi, 32-22, Fujisakakita-machi Hirakata-shi, Osaka-fu; Toshio Takahashi, 6-8-404, Kita-Sakurazuka 3-chome, Toyonaka-shi, Osaka-fu; Hiroshi Yokota, 18-5-308, Imafuku-Nishi 2-chome, Joto-ku, Osaka-shi; Katsutoshi Shibayama, 1-4-1109, Shigino-Nishi 5-chome, Joto-ku, Osaka-shi, all of Japan

[21] Appl. No.: 467,653

[22] Filed: Jan. 19, 1990

[51] Int. Cl.$^5$ .............................................. B65G 17/00
[52] U.S. Cl. .................................................... 198/779
[58] Field of Search ........................................ 198/779

[56] References Cited

U.S. PATENT DOCUMENTS 3,701,413  10/1972  Leahy et al. ..................... 198/779
4,339,030   7/1982  Hirata ............................. 198/779

FOREIGN PATENT DOCUMENTS 870265  10/1981  U.S.S.R. ............................. 198/779

Primary Examiner—Robert P. Olszewski
Assistant Examiner—Cheryl L. Gastineau
Attorney, Agent, or Firm—Eckert Seamans Cherin & Mellott

[57] ABSTRACT

An acceleration accumulating conveyor chain includes connecting pins with outer link plates disposed at opposite ends thereof, bushings clearance fitted with the connecting pins, each having a larger diameter article carrying roller and a smaller diameter running roller coaxially positioned, and inner link plates clearance fitted with the bushings at both ends thereof. The pins contact the bushings along the whole length of the bushings, whereby the bearing pressure per unit area is low. The clearance fit between the bushings and the inner link plates provides "play" permitting the running rollers to positively roll along a supporting rail. A rotation preventing mechanism can be provided at the engaging structures between the bushings and the inner link plates. By preventing rotation of the bushings relative to the inner link plates, noise caused by rotation of the bushings is eliminated.

14 Claims, 4 Drawing Sheets

ACCELERATION ACCUMULATING CONVEYOR CHAIN

BACKGROUND OF THE INVENTION

1. Field of the Invention

This invention relates to the field of conveyor chains and in particular to a so-called "acceleration accumulating" conveyor chain of the type wherein conveyed articles can be carried on the chain while moving at other than the chain speed, e.g., the articles can move in excess of the chain speed, or the articles can remain stationary as the chain carrying the articles passes underneath.

2. Prior Art

A typical conventional acceleration accumulating chain (hereinafter simply termed a "chain") is shown in FIG. 7. The chain 10 comprises bushings 13, having article-carrying rollers 11 of relatively larger diameter and running rollers 12 of relatively smaller diameter, coaxial with one another and with their respective bushings. Connecting pins 14 extend through the bushings 13, and inner link plates 15, 15 as well as outer link plates 16, 16 are disposed at both ends of the connecting pins 14. The running rollers 12 can support the chain on rails (not shown in FIG. 7) as articles rest on article rollers 11 and the chain is carried longitudinally along a chain run by the connected parts.

Such an arrangement requires relative rotation of the connected parts of the links in order to allow the article rollers to rotate with passage of the articles and to allow the running rollers to rotate with passage of the chain over the rails. In the known chain 10 as shown in FIG. 7, "play" is intentionally imparted to the connected parts in addition to the clearance necessary to allow relative rotation, namely by means of a clearance between the connecting pin 14 and its mating aperture of the inner link plate 15. This play allows the running rollers 12, 12 to roll positively along the rails, maintaining contact even if the alignment of the chain (and in particular the connecting pins) relative to the rails is disturbed.

This solution to the problems of permitting relative rotation of the parts and maintaining desired roller alignment has adverse consequences with respect to wear on the chain, noise generated by the chain in use, and the maintenance requirements for dealing with these intentionally loose fitting parts.

Loads on this form of chain are concentrated on the relatively small contact area between the smaller connecting pin 14 and the larger apertures 17 of the inner link plates 15. A high bearing pressure per unit area occurs at the point of contact. Wear at the contact area therefore tends to be higher than would accrue over a larger contact area, and wear causes elongation of the chain. As a result, the optimum allowable load on the conventional chain is relatively low.

Noises due to friction are generated by the known chain, especially when the chain engages a sprocket (not shown). A periodic supply of lubricating oil can help to reduce friction and noise, however, such lubrication is not always possible or desirable, for example in a clean room area where dirt and dust must be suppressed. In such environments, noise is a problem and the chain wears and periodically must be replaced. Relatively high levels of noise are also produced by the chain running on the rails, particularly if the bushings are made of steel, as is usually preferred.

Another type of known chain is shown in FIG. 8, and is characterized by certain modifications intended to cope with the problems of the conventional chain shown in FIG. 7. Chain 20 as shown in FIG. 8 has elongated bushings 23, which are press fit to attach rigidly to inner link plates 25, 25. The connecting pins 24 have a diameter $d_1$ which is smaller than the inner diameter D of the bushings 23. This structure allows the connecting pins 24 to contact the inner surface 23A of the bushings 23 all along their length, at least when the connecting pins are parallel to their respective bushings, resulting in a decreased contact pressure per unit area as compared to the conventional chain of FIG. 7. The clearance for chain play in this embodiment is between the connecting pin and the inside of bushing 23, the latter being attached to the inner link plate, and the former being attached to the outer link plate.

However, if during assembly or thereafter the connecting pin 24 and the bushing 23 are not precisely parallel, twisting forces or torsions are generated, tending to misalign links of the chain. These torsions may not be absorbed within the clearances between the pins 24 and the bushings 23. Misalignment may cause the running rollers 22 to lose contact with the rail, thereby defeating the acceleration accumulating function which is a basic object of this type of chain. Inasmuch as the diameter of the pins is relatively small, it is often difficult to attain the desired degree of accuracy in parallel alignment of the pins and bushings for all the links in a chain when manufactured. Furthermore, the arrangement is apt to wear. Accordingly, satisfactory solutions to the problems of the conventional chain remain to be achieved.

SUMMARY OF THE INVENTION

It is an object of the invention to resolve the foregoing problems with known acceleration accumulating chains, in particular problems with chain wear and noise, providing a smoother and longer lasting chain.

It is another object of the invention to allow increased loading of a chain without correspondingly increased wear, chain elongation, noise and lubrication requirements.

It is a further object of the invention to provide an improved chain structure that is easily and dependably manufactured.

These and other objects are accomplished by an acceleration accumulating conveyor chain including connecting pins with outer link plates disposed at opposite ends thereof, bushings clearance fitted with the connecting pins, each having a larger diameter article carrying roller and a smaller diameter running roller coaxially positioned, and inner link plates clearance fitted with the bushings at both ends thereof.

Since the pins contact the bushings along the whole length and inner surface of the bushings, the bearing pressure per unit area is low. Moreover, due to the clearance fit between the bushings and the inner link plates, the chain is characterized by the desirable "play".

In addition, a rotation preventing mechanism can be provided at the engaging structures between the bushings and the inner link plates. By preventing rotation of the bushings relative to the inner link plates, noise caused by rotation of the bushings is eliminated.

BRIEF DESCRIPTION OF THE DRAWINGS

There are shown in the drawings the embodiments of the invention as presently preferred. It should be understood that the invention is not limited to the precise arrangements and instrumentalities shown in the drawings, which are exemplary. The invention is capable of other specific embodiments and configurations of its elements in accordance with the invention as defined in the appended claims. In the drawings:

DETAILED DESCRIPTION OF THE PREFERRED EMBODIMENTS

Figure 1:
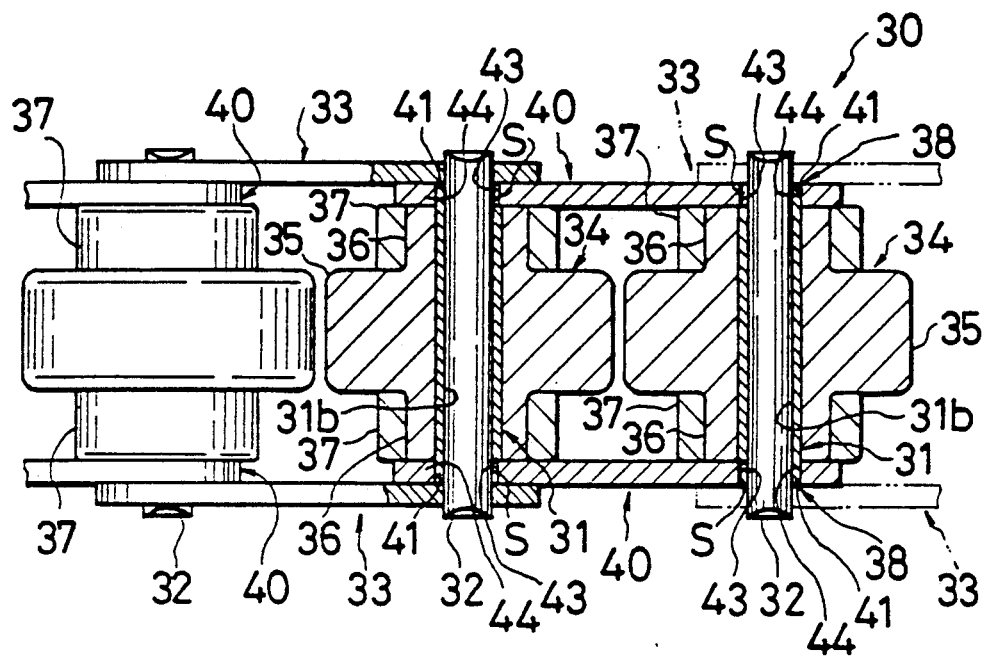
FIG. 1 is a plan view of the acceleration accumulating conveyor chain according to the invention, shown partially broken away.
Figure 2:
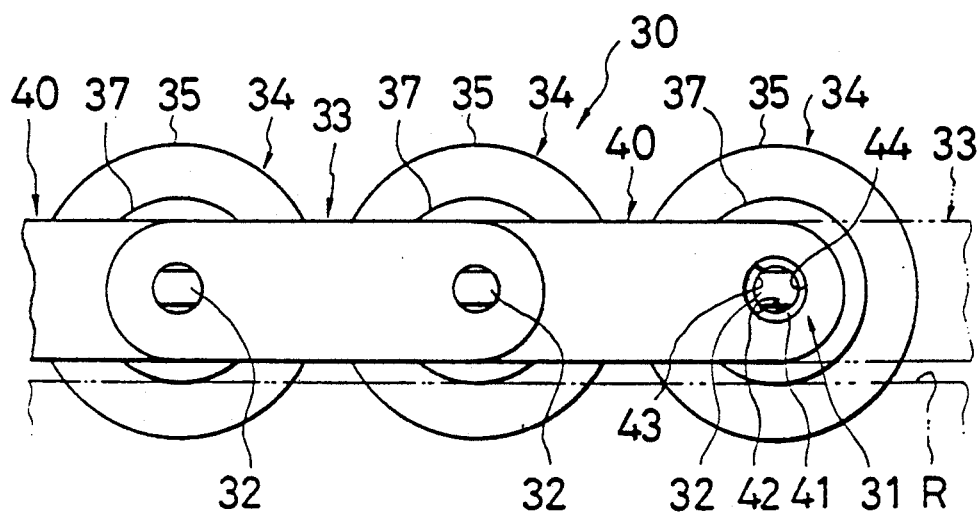
FIG. 2 is a front view of the embodiment of FIG. 1.
Figure 3:
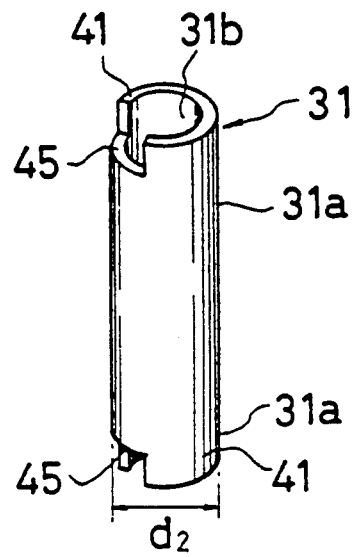
FIG. 3 is a perspective view of a preferred bushing to be incorporated in the chain.
Figure 4A:
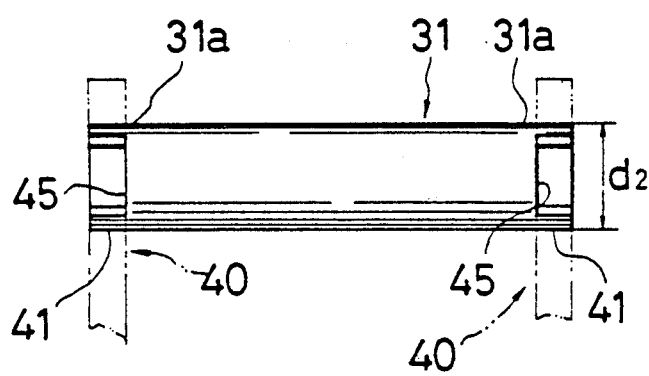
FIGS. 4(A) and 4(B) are side elevation and end views, respectively, of the bushing of FIG. 3.
Figure 4B:
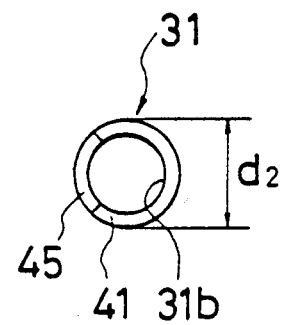

The acceleration accumulating conveyor chain 30 according to the invention as shown in FIGS. 1 and 2, comprises outer link plates 33, 33 having connecting pins 32 press-fit therein for a non-movable connection. Bushings 31 are clearance fitted on the connecting pins and can rotate relative thereto with flexing of the chain. Article carrying rollers 34 are clearance fitted with the bushings 31, being free to rotate relative to the bushings 31 and relative to the connecting pins. Each of the article carrying rollers 34 integrally includes a larger diameter portion 35, the diameter of which is greater than the width of the link plates 33, 33 such that the article carrying rollers protrude, and a smaller diameter portion 36, 36, to which smaller diameter running rollers 37, 37 are clearance fitted such that they are freely rotatable. The article carrying rollers 34 and the running rollers 37, 37 can be made of a plastic material.

At both ends 31a, 31a of the bushings 31, which are preferably made of steel and have a diameter $d_2$, the bushings are clearance fitted into inner link plates 40 by means of apertures 42, 42. That is, the internal diameter A of apertures 42, 42 as shown in FIGS. 3, 4(A), 4(B) and 5, is greater than the external diameter $d_2$ of bushings 31. This gives the chain the necessary "play" that among other things permits the running rollers to run positively along the rails notwithstanding any discontinuities in the alignment of the chain as defined by the connecting pins. Moreover, at said clearance fitted portions, rotation prevention mechanisms are provided so as to prevent the bushings 31 from rotating relative to inner link plates 40. Therefore, the ends of the bushings can shift with respect to inner link plates 40, but do not rotate.

Figure 5:
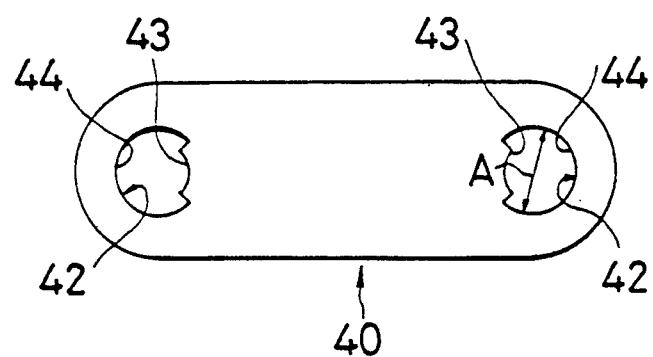
FIG. 5 is a plan view of a preferred inner link plate.

A preferred rotation prevention mechanism 38 comprises, as shown in FIGS. 4 and 5, crescent-shaped extensions 41, 41 at both ends 31a, 31a of the bushing 31 and inward facing arcuate protrusions 43, 43, formed at the peripheries 44, 44 of the apertures 42, 42 of the inner link plates 40. The protrusions define a stepped decrease from diameter A, engaging with a corresponding gap or stepped portion 45 in an extension 41 at each end 31a, 31b of the bushing 31 when the extensions 41, 41 are inserted into the apertures 42, 42, respectively. The respective peripheries 44, 44 of the apertures 42, 42 of the inner link plate 40 are arranged such that the protrusions 43 face in opposite directions along the longitudinal run of the chain.

The bushing 31 is prevented from rotating due to the extension 41 engaging non-rotatably with the protrusion 43. The bushing 31 spaces the inner link plates 40 from one another laterally of the chain, whereby the inner link plates do not bear unduly on the boss portion 36 of the article carrying roller or the running roller 37. This lateral spacing of the inner link plates (i.e., axially of the connecting pins and the rollers) is due to the existence of the stepped portions 45, 45 adjacent the extensions 41, 41, against which protrusions 43, 43 of the inner link plates rest.

When the chain 30 runs along the rail R by means of the running rollers 37, 37 (see FIG. 2), article supporting roller 34 and the running roller 37 tend to rotate together due to friction between the running roller 37 and the boss portion 36 on which the running roller is carried with a clearance fit. Owing to the difference of the diameters of the running roller 37 and the fact that the larger diameter portion 35 bears the articles (not shown), the articles can be "accelerated", namely conveyed on the running rollers 35 at a linear speed greater than the running speed of the chain 30 itself. If the articles are stopped for some reason such as obstruction by a leading article, a braking force will act on the article supporting roller 34 and rotational slippage occurs between the boss portion 36 and the running roller 37, thereby keeping the articles stationary while the chain itself keeps running.

Tensile forces act on the running chain 30 in the longitudinal direction, but since in this direction the forces are borne by the entire contact area between the pin 32 and the inner surface 31b of the bushing 31, including the extensions 41, 41, the load per unit area is low. Furthermore, a clearance S may be created as shown in FIG. 1 between the bushing 31 and the inner link plate 40 and as a result of the clearance the chain has adequate play to accommodate twisting displacement.

The particular structure of the invention has a number of advantages. Wear on the chain and the elongation of the chain due to wear are substantially decreased. The optimum load capacity of the chain is increased, without adverse effects. The chain is smooth running and quiet.

In addition, as the bushing 31 is clearance fitted to the inner link plate 40 by means of a rotation prevention mechanism, noises produced by flexing of the chain are less. It is less necessary or even unnecessary to lubricate the chain with oil. Smoother acceleration operation of the chain may be attained, because possible torsions of the chain are better absorbed, assuring that the chain more positively remains in contact with the rail R and therefore more effectively drives the articles via the larger article carrying rollers.

Inasmuch as the bushing 31 need not be press fitted to the inner link plate 40, as previously was the case, possible barrel shaped deformation of the bushing can be avoided. The inner link plates 40 are accurately spaced to avoid axial pressure against the boss portion 36 of the article carrying roller and/or against the axial ends of the running roller 37, which would restrict rotation.

Accordingly, the article carrying roller 34 and the running roller 37 rotate smoothly, which also assures smoother running of the chain. Because bushing 31 is prevented from rotating relative to the inner link plate 40, the running noise of the chain is low. Except for flexing motions, only the article carrying rollers and the running rollers rotate, and these rollers can be made of plastic, further making chain operation less apt to cause noise.

Figure 6:
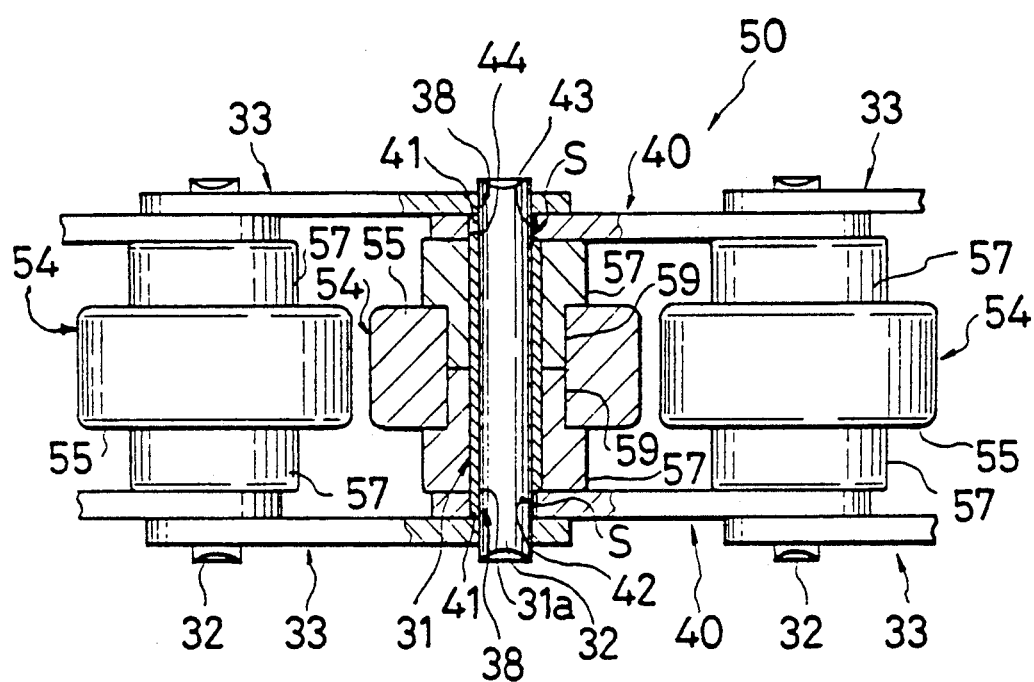
FIG. 6 is a plan view illustrating an alternative embodiment of the invention and corresponding to FIG. 1.
Figure 7:
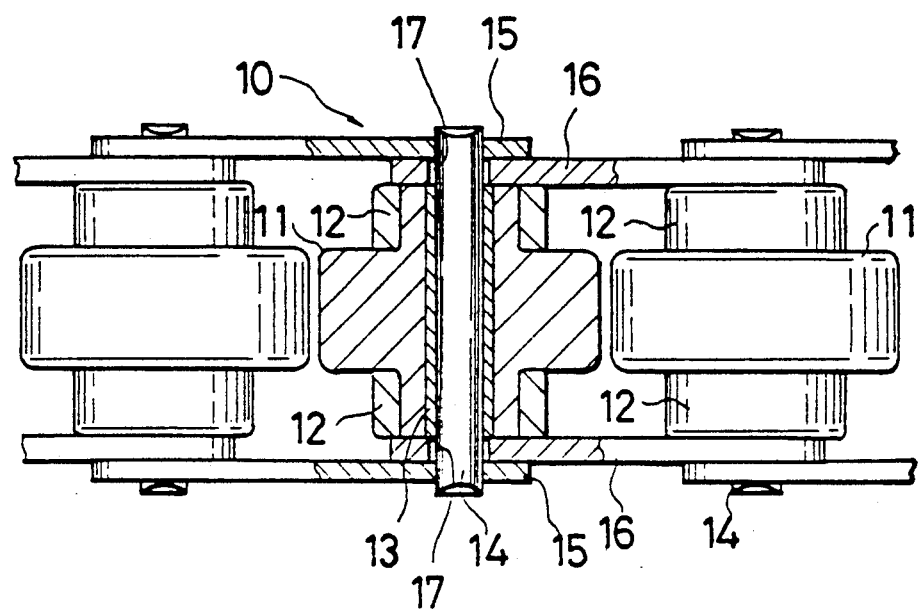
FIG. 7 is a plan view of a conventional prior art acceleration accumulating conveyor chain; and, FIG. 8 is a plan view of another conventional prior art acceleration accumulating conveyor chain.
Figure 8:
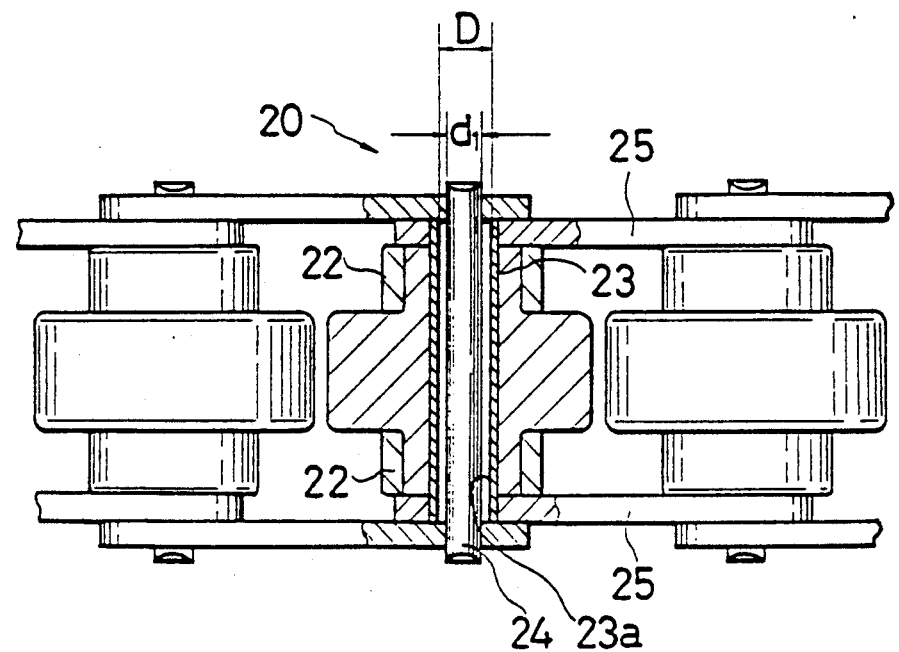

An alternative embodiment of the invention is illustrated in FIG. 6. In this embodiment, chain 50 comprises a pair of discrete running rollers 57, 57 of a plastic material, and a single article supporting roller 55, also of plastic, defining the larger diameter portion 54. In order to support the article supporting roller 55 against misalignment or lateral displacement, a neck or flange portion 59 is formed on the running rollers 57, 57, the article carrying roller 55 thus residing between the running rollers and being supported thereby. In other respects, and in particular with respect to the attachment of bushing and link plates, the embodiment of FIG. 6 is similar to the embodiment of FIGS. 1 and 2. The same references numerals are used for corresponding parts, and reference can be made to the description provided above with respect to these parts. The embodiment of FIG. 6 enjoys the same advantages as the embodiment of FIG. 1, however, this embodiment is somewhat easier to assemble.

The rotation prevention mechanism employed in the attachment of the bushings 31 to the inner link plates, which as noted above is preferably a crescent shaped extension of the bushing fitting in a complementary opening in the inner link plate, can also be arranged in other non-round shapes and with other particular engaging elements. For example, more than one extension can be received at each end of the bushing in complementary openings in the inner link plate. Other variations on the concept will be apparent in view of this disclosure.

The invention having been disclosed, a number of alternatives and variations will occur to persons skilled in the art. Reference should be made to the appended claims rather than the foregoing specification as defining the scope of the invention in which exclusive rights are claimed.

We claim:

1. An acceleration accumulating conveyor chain, with a link comprising:
   a connecting pin having outer link plates at each end thereof;
   a bushing coaxially disposed loosely on the connecting pin to define a clearance between the bushing and the connecting pin;
   a larger diameter article carrying a roller and a smaller diameter running roller coaxially disposed on the bushing; and,
   inner link plates at both ends of said bushing, the inner link plates defining apertures dimensioned to loosely receive the ends of said bushing to define a clearance between the inner link plates and the ends of the bushing, wherein a rotation prevention mechanism is provided between the ends of said bushing and the inner link plates to prevent relative rotation of said bushing and the inner link plates.

2. The acceleration accumulating conveyor claim according to claim 1, wherein the rotation prevention mechanism is provided by a non-round complementary shape of the ends of the bushing and the apertures in the inner link plates.

3. The acceleration accumulating conveyor chain according to claim 1, wherein the ends of the bushing have an axially stepped surface, and apertures of the inner link plates for receiving said bushing have protrusions bearing axially on said stepped surface.

4. The acceleration accumulating conveyor chain according to claim 1, wherein one of the article carrying roller and the running roller has a section of smaller diameter than the other, said other of the article carrying roller and the running roller being rotatably carried on said one.

5. The acceleration accumulating conveyor chain according to claim 1, wherein the article carrying roller is disposed between two said running rollers.

6. The acceleration accumulating conveyor chain according to claim 5, wherein one of said article carrying roller and said running rollers has a section of smaller diameter than the other, said other of the article carrying roller and the running rollers being rotatably carried on said one.

7. The acceleration accumulating conveyor chain according to claim 1, wherein at least one of the article carrying roller and the running roller is at least partly made of a plastic material.

8. An acceleration accumulating conveyor chain, having a plurality of interconnected links, each link comprising:
   a connecting pin having outer link plates at each end thereof;
   a bushing fitted to the connecting pin, the bushing and the connecting pin being relatively rotatable with respect to one another;
   a larger diameter article carrying roller and a smaller diameter running roller coaxially disposed on the bushing;
   inner link plates at both ends of said bushing, the inner link plates defining apertures dimensioned to loosely receive the ends of said busing; and,
   means for preventing rotation between the bushing and the inner link plates.

9. The acceleration accumulating conveyor chain according to claim 8, wherein the article carrying roller and the running roller are frictionally engaged and relatively rotatable with respect to one another and with respect to the bushing.

10. The acceleration accumulating conveyor chain according to claim 8, wherein the means for preventing rotation includes a non-round shape of the ends of the bushing engaging in the apertures in the inner link plates.

11. The acceleration accumulating conveyor chain according to claim 8, wherein one of the article carrying roller and the running roller has a section of smaller diameter than the other, said other of the article carrying roller and the running roller being rotatably carried on said one.

12. The acceleration accumulating conveyor chain according to claim 11, wherein the article carrying roller is disposed between two said running rollers.

13. The acceleration accumulating conveyor chain according to claim 11, wherein one of said article carrying roller and said running rollers has a section of smaller diameter than the other, said other of the article carrying roller and the running rollers being rotatably carried on said one.

14. The acceleration accumulating conveyor chain according to claim 8, wherein at least one of the article carrying roller and the running roller is at least partly made of a plastic material.

* * * * *

UNITED STATES PATENT AND TRADEMARK OFFICE
CERTIFICATE OF CORRECTION

PATENT NO. : 5,035,318

DATED : July 30, 1991

INVENTOR(S) : Kawabata et al.

It is certified that error appears in the above-identified patent and that said Letters Patent is hereby corrected as shown below:

On the title page, please insert the Assignee information:

--[73] Assignee: Tsubakimoto Chain Co., Japan--.

Signed and Sealed this

Thirteenth Day of April, 1993

Attest:

STEPHEN G. KUNIN

Attesting Officer    Acting Commissioner of Patents and Trademarks